US009850956B2

(12) United States Patent
Berens

(10) Patent No.: US 9,850,956 B2
(45) Date of Patent: Dec. 26, 2017

(54) BEARING ASSEMBLY

(71) Applicant: Frank Berens, Saunay (FR)

(72) Inventor: Frank Berens, Saunay (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 15/219,766

(22) Filed: Jul. 26, 2016

(65) Prior Publication Data
US 2017/0030413 A1 Feb. 2, 2017

(30) Foreign Application Priority Data

Jul. 29, 2015 (FR) ...................................... 15 57244

(51) Int. Cl.
F16C 35/07 (2006.01)
F16C 33/78 (2006.01)
F16C 19/06 (2006.01)
F16C 35/077 (2006.01)
F16C 35/073 (2006.01)

(52) U.S. Cl.
CPC ............ *F16C 35/077* (2013.01); *F16C 19/06* (2013.01); *F16C 33/7886* (2013.01); *F16C 35/073* (2013.01); *F16C 33/782* (2013.01); *F16C 33/783* (2013.01); *F16C 2226/70* (2013.01);
(Continued)

(58) Field of Classification Search
CPC .... F16C 27/06; F16C 27/066; F16C 33/7863; F16C 33/7866; F16C 33/76; F16C 33/7879; F16C 33/78; F16C 33/782; F16C 33/7823; F16C 33/72; F16C 33/7816; F16C 33/783; F16C 33/7826; F16C 33/784; F16C 33/7896; F16C 33/7859; F16C 33/767; F16C 33/7886; F16C 19/06; F16C 35/073; F16C 35/077; F16C 2226/70; F16C 2226/72; F16C 2226/76

See application file for complete search history.

(56) References Cited

U.S. PATENT DOCUMENTS 2,986,432 A * 5/1961 Schlauch .............. F16C 27/066
384/536
3,097,896 A * 7/1963 Wasley ................. F16C 23/086
277/361

(Continued)

FOREIGN PATENT DOCUMENTS

DE 102014210157 A1 * 12/2015 .......... F16C 33/7886
FR 2633348 A1 12/1989
(Continued)

*Primary Examiner* — Alan B Waits
(74) *Attorney, Agent, or Firm* — Bryan Peckjian; SKF USA Inc. Patent Dept.

(57) ABSTRACT

The invention relates to a bearing assembly providing a bearing having a first ring with a hole, two front edges and an outer cylindrical surface, and a second ring having a hole, two front edges and an outer cylindrical surface, the first and second rings being relatively in relative rotation about a central axis. At least one row of rolling elements is housed in a bearing chamber formed between an outer cylindrical surface and a hole of the rings. The assembly is configured to be mounted in a housing. The assembly also includes at least one envelope mounted on one of the rings of the bearing, such that a dimensional difference between the housing and the bearing is compensated by the envelope.

5 Claims, 6 Drawing Sheets

(52) U.S. Cl.
CPC ...... *F16C 2226/72* (2013.01); *F16C 2226/76* (2013.01)

(56) References Cited

U.S. PATENT DOCUMENTS

| | | | | |
|---|---|---|---|---|
| 3,476,395 A | * | 11/1969 | Cornelius | F16C 33/76 277/350 |
| 4,727,970 A | * | 3/1988 | Reik | F16C 19/52 192/110 B |
| 4,854,751 A | * | 8/1989 | Grassmuck | F16C 27/066 384/476 |

FOREIGN PATENT DOCUMENTS

| | | | | |
|---|---|---|---|---|
| GB | 2269864 A | | 2/1994 | |
| JP | S6135222 U | | 3/1986 | |
| JP | 2009168110 A | * | 7/2009 | ......... F16C 33/3875 |

* cited by examiner

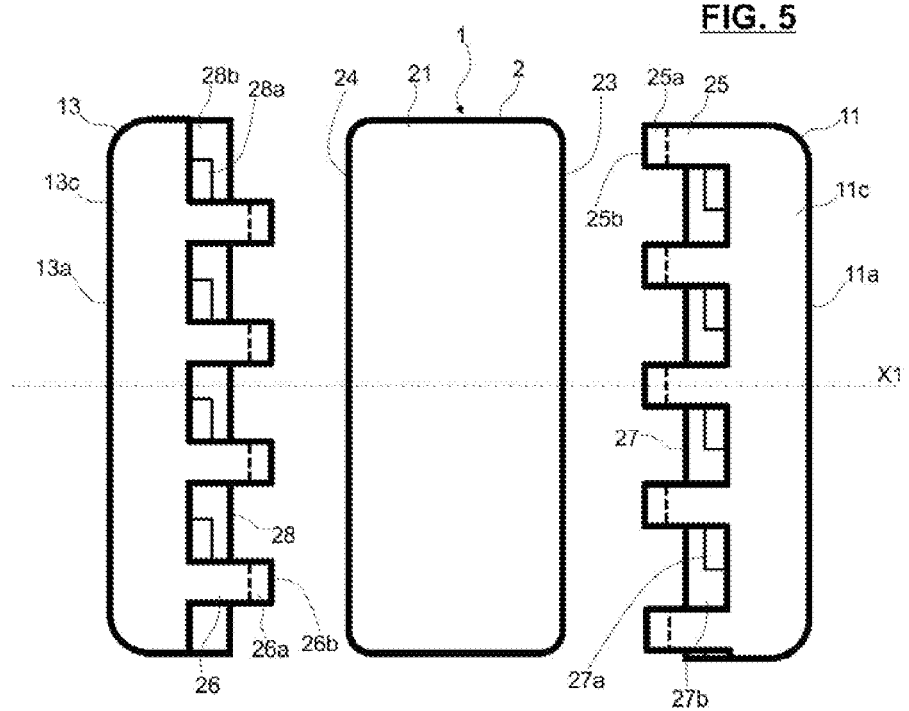

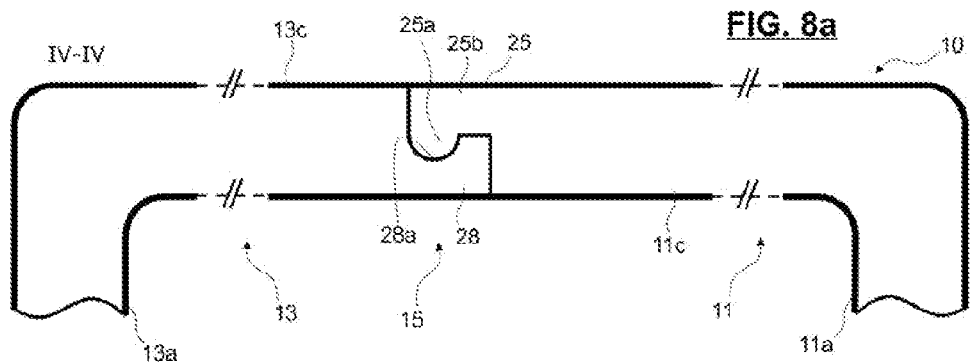
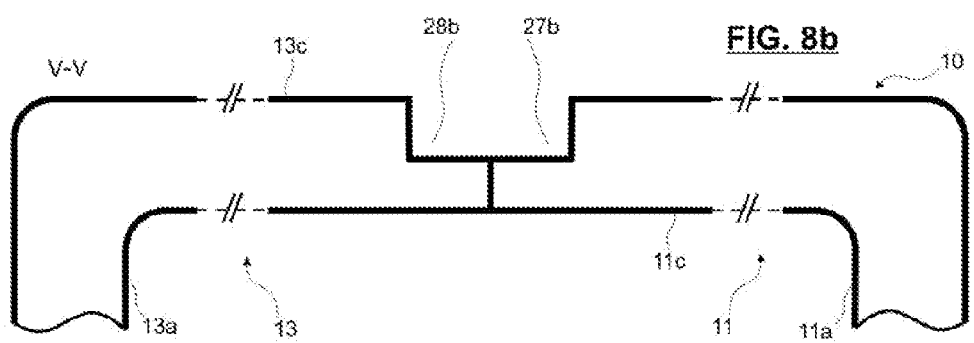
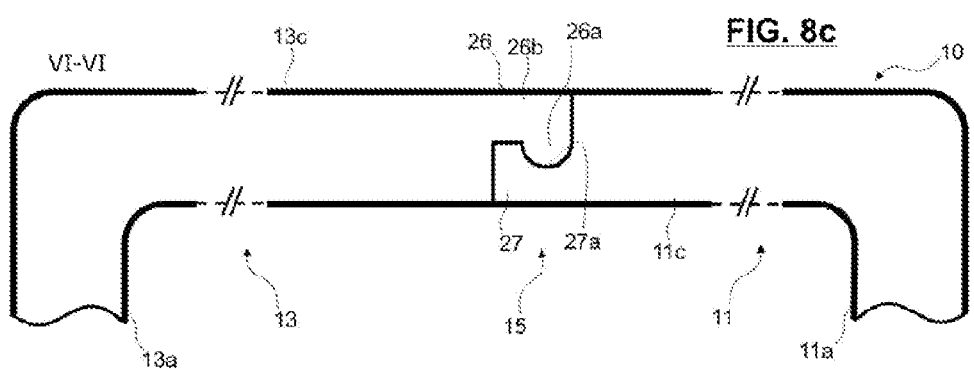

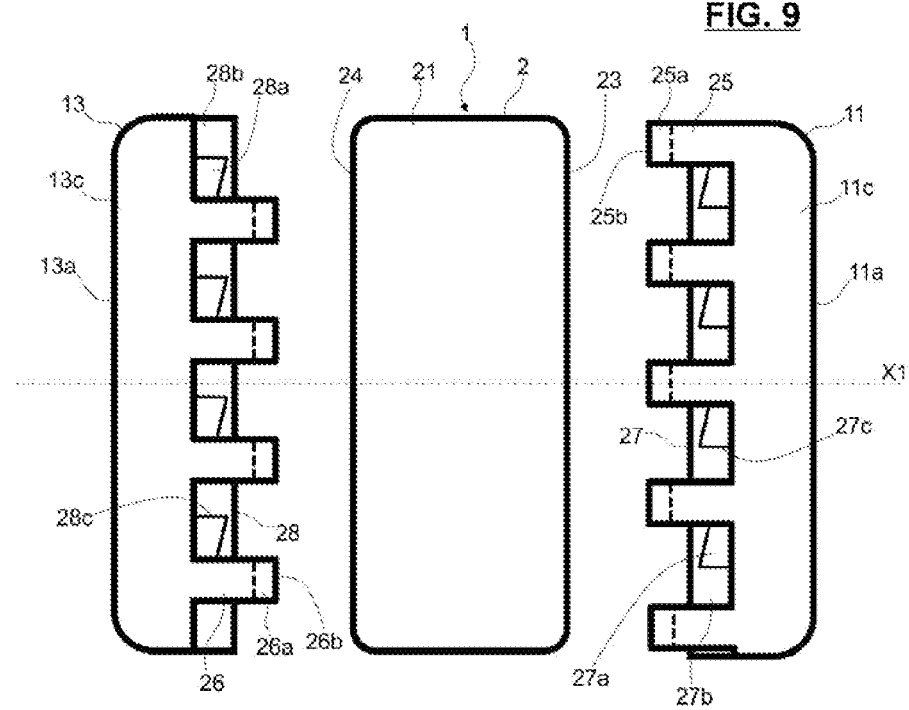
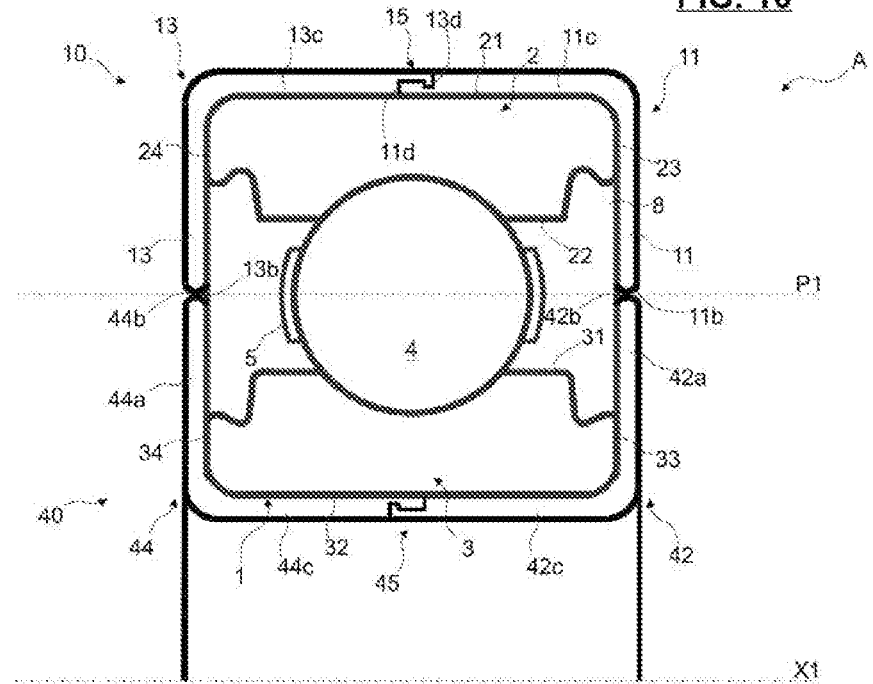

BEARING ASSEMBLY

CROSS REFERENCE TO RELATED APPLICATIONS

This application claims priority to French patent application no. 1557244 filed on Jul. 29, 2015, the contents of which are fully incorporated herein by reference.

FIELD OF THE INVENTION

The present invention relates to an assembly comprising a bearing.

BACKGROUND OF THE INVENTION

A bearing usually provides an inner ring and an outer ring, the rings being in rotation relative to one another. The rings may together form a bearing chamber containing the rolling elements, such as balls, needles or rollers.

A bearing is designed to be mounted in a housing of a mechanical system between a static mechanical element and a mechanical element moveable in rotation such as to support the relative rotation of same.

The design of a bearing, and more specifically the type of bearing, the number of rows of rolling elements, the type of rolling elements, and the dimensioning of the rings and of the rolling elements, depends on the intended application of the mechanical system. The conditions relating to torque, rotational speed, load, environment and even the space available inside the housing affect the bearing and therefore constitute design constraints on same.

BRIEF SUMMARY OF THE INVENTION

However, manufacturers of mechanical systems and/or bearings may change their ranges and lose compatibility.

Although the features of bearings have been improved, bearings still have the same seat, and a smaller seat could be beneficial.

It is known from JP-U-S61 35222 to provide a bearing assembly with an envelope mounted on the outer ring of the bearing. Such an envelope can enable compensation of a dimensional difference between the housing and the bearing. According to the prior art, the envelope includes distinct first and second envelope parts, each part having an annular flange at least partially overlapping a front edge of the ring, and a cylindrical portion extending from the flange and at least partially overlapping the cylindrical surface or hole of the ring outside the bearing chamber, the two envelope parts being rigidly connected to one another by attachment means provided on the cylindrical portions. The attachment means provide at least one cavity formed at one end portion of the cylindrical portion of the first envelope part and at least one relief formed at one end portion of the cylindrical portion of the second envelope part, the relief being housed in the related cavity to attach the first and second envelope parts.

The cavity in the first envelope part and the relief in the second envelope part are annular. One drawback of such an arrangement is that relative rotation between the two envelope parts may occur.

The ends of the envelope parts need to be deformed to seat the relief on the second envelope part inside the cavity in the first envelope part. The ends are difficult to deform radially on account of the annular shape of same.

The invention is in particular intended to address these problems by proposing a bearing assembly that is simple to make and to assemble, and that is modular in terms of use and adaptation to numerous applications.

For this purpose, the invention relates to a bearing assembly comprising a bearing provided with a first ring having a hole, two front edges and an outer cylindrical surface, and a second ring having a hole, two front edges and an outer cylindrical surface. The first and second rings may be in relative rotation about a central axis. The bearing also includes at least one row of rolling elements housed in a bearing chamber formed between an outer cylindrical surface and a hole of the rings. The assembly is designed to be mounted in a housing.

The assembly includes at least one envelope mounted on one of the rings of the bearing, such that a dimensional difference between the housing and the bearing is compensated by the envelope. The envelope includes distinct first and second envelope parts, each part having an annular flange at least partially overlapping a front edge of the ring, and a cylindrical portion extending from the flange and at least partially overlapping the cylindrical surface or hole of the ring outside the bearing chamber, the two envelope parts being rigidly connected to one another by attachment means provided on the cylindrical portions. The attachment means provide at least one cavity formed at one end portion of the cylindrical portion of the first envelope part and at least one relief formed at one end portion of the cylindrical portion of the second envelope part, the relief being housed in the related cavity to attach the first and second envelope parts.

According to the invention, the annular end portion of the cylindrical portion of the first envelope part includes a plurality of reliefs and cavities spaced out regularly, successively and alternately about the circumference. The annular end portion of the cylindrical portion of the second envelope part includes a plurality of reliefs and cavities spaced out regularly, successively and alternately about the circumference.

Thanks to the invention, the difference between the dimensions between the bearing and the housing in which the bearing is designed to be mounted is compensated by the thickness of the envelope rigidly connected to one of the rings. More specifically, the flanges and the cylindrical portions of the envelope parts act as bearing surfaces with the housing in place of the front edges and the outer cylindrical surfaces of the bearing.

A standard small bearing can be adapted to other applications without having to modify the whole mechanical system. This helps to reduce the time and cost related to designing the mechanical system. Furthermore, if the dimensions of the housing are outside a predetermined range, a standard bearing from the range can be adapted.

The invention also makes it possible to adapt small bearings in place of larger bearings, while incorporating additional functions using the flanges.

Another advantage is that no modifications are made to the standard bearing. The envelope is mounted on the rings after the bearing has been designed and manufactured. The envelope is mounted on the outside of the bearing.

Furthermore, once the envelope has been assembled, the reliefs and cavities are circumferentially adjacent to one another. Since the attachment means are found alternately on two separate envelope parts, the attachment means thus formed provide an anti-rotation function between the two portions of the envelope.

Assembling the two envelope parts on a ring is relatively simple for an operator since he need simply position same manually or mechanically on the ring to insert one relief of one of the portions into a related cavity of the other portion.

The two parts are then rigidly connected together and cannot be removed from the ring. The envelope parts can then be assembled at the site where the bearing is manufactured, then the assembly is transported to the manufacturer of the application or assembled directly at the site where the application is manufactured.

According to advantageous but optional aspects of the invention, such a bearing assembly may include one or more of the following features in any technically admissible combination:

- The rolling elements are spaced out regularly about the circumference, and held by a cage.
- The rolling elements are balls.
- The first and second rings of the bearing are solid.
- The rings and the rolling elements determine a pitch diameter of the bearing that is parallel to the axis of relative rotation of the first and second rings of the bearing.
- The rings and the rolling elements determine a pitch diameter of the bearing that is perpendicular to the axis of relative rotation of the first and second rings of the bearing.
- The envelope includes at least one layer of material made of a vibration-damping material.
- The envelope includes at least one layer of electrically insulating material to prevent electrical currents from passing through the bearing.
- The envelope is made of a plastic or synthetic material.
- At least one flange of the envelope mounted on the first ring is in sliding contact with the other ring, either directly against one of the surfaces of the second ring or indirectly against an element rigidly connected to the second ring.
- The assembly includes two envelopes fitted to each of the rings of the bearing.
- The two envelopes fitted to each of the rings of the bearing are in sliding contact via the flanges of same in pairs such as to ensure that the bearing is completely sealed.
- The cylindrical portions of the two parts of the envelope are annular and overlap the entire cylindrical surface or the hole of the ring.
- The shapes of the relief and of the related cavity match one another.
- The relief is a bead that is rounded or beveled to facilitate insertion of same.
- The end portions of the cylindrical portions of the first and second envelope parts bearing the at least one relief and the at least one cavity overlap one another.
- The thicknesses of the end portions of the cylindrical portions of the first and second envelope parts bearing the at least one relief and the at least one cavity are strictly less than the rest of the cylindrical portions, such as to form shoulders.
- The edges of each of the cylindrical portions of the first and second envelope parts come into contact with the shoulders on the other envelope part.
- The annular end portions provided with a plurality of reliefs and cavities successively and alternately of the cylindrical portions of the first and second envelope parts are circumferentially adjacent.
- Each end portion provided with a relief of the first and second envelope parts is circumferentially adjacent to a single end portion provided with a cavity, a spacing zone being formed between two successive relief-cavity pairings.
- The end portion of the cylindrical portion of the first envelope part includes a plurality of tabs.
- The end portion of the cylindrical portion of the second envelope part includes a plurality of tabs.
- All of the tabs of the cylindrical portion of the first envelope part have cavities.
- All of the tabs of the cylindrical portion of the second envelope part have cavities.
- Successive tabs of the two envelope parts are provided alternately with a relief and a cavity.
- Successive tabs of the two envelope parts provided alternately with a relief and a cavity are circumferentially adjacent.
- The tabs are regularly distributed around the circumference.
- The tabs extend from the cylindrical portion towards the other envelope part.
- An end portion of a first envelope part includes at least one attachment means comprising a relief and an end portion of a second envelope part includes at least one attachment means comprising a cavity, at least one of the end portions having at least one spacing zone adjacent to an end portion provided with one of the attachment means.
- The cavities have a flared edge to facilitate insertion of the reliefs.

The invention also relates to a method for assembling a bearing assembly according to a specific embodiment of the invention, comprising the following steps:

(a) A bearing is assembled in advance,
(b) Two envelope parts are positioned coaxially and on either side of one of the rings of the bearing, an end portion of a first envelope part including at least one attachment means comprising a relief and an end portion of a second envelope part including at least one attachment means comprising a cavity, at least one of the end portions having at least one spacing zone circumferentially adjacent to an end portion provided with a cavity on one side and to an end portion provided with a relief on the other side,
(c) The end portion of one of the envelope parts slides axially onto at least one spacing zone of the other envelope part such that the end portion overlaps the spacing zone radially,
(d) A relative rotation about the axis is applied to the envelope parts such as to slide the end portion including at least one attachment means of one of the envelope parts in rotation from the spacing zone towards the end portion including at least one attachment means of the other envelope part, and
(e) The attachment means of the envelope parts cooperate with one another.

BRIEF DESCRIPTION OF THE SEVERAL VIEWS OF THE DRAWING

The invention and other advantages thereof are set out more clearly in the description below of embodiments of a bearing assembly according to the principle of the invention, which are provided purely as examples and with reference to the non-drawings attached, in which:

FIG. 5 is a side view of a first bearing assembly position according to a second embodiment, FIGS. 8a, 8b and 8c are the cross-sectional views IV-IV, V-V and VI-VI respectively of details of an envelope of a bearing assembly according to the second embodiment, FIG. 9 is a side view of a bearing assembly according to a third embodiment, and FIG. 10 is a side view of a bearing assembly according to a fourth embodiment.

DETAILED DESCRIPTION OF THE INVENTION

Figure 1:
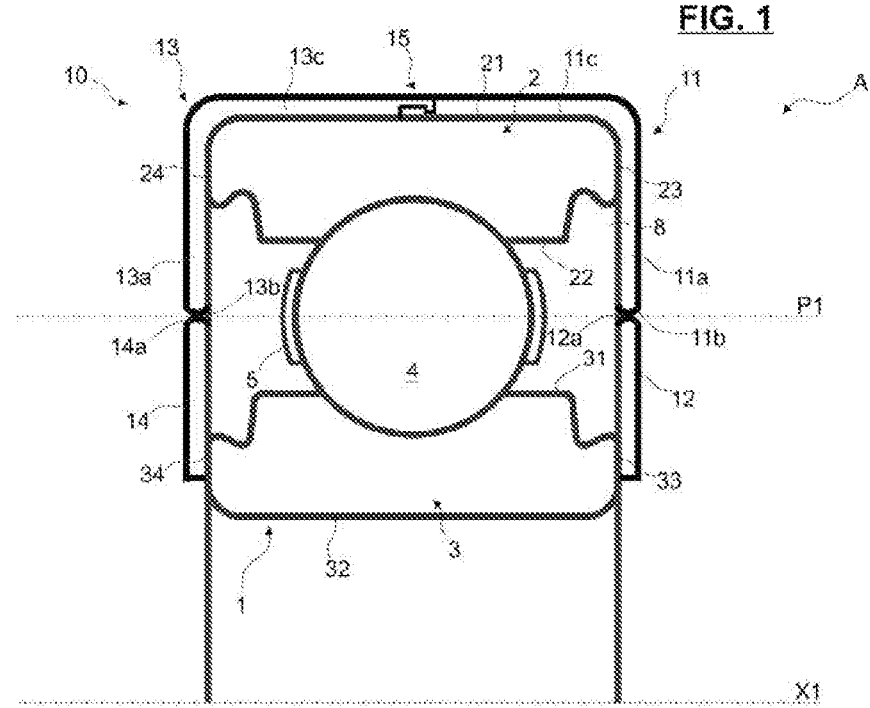
FIG. 1 is a cross-sectional view of a bearing assembly according to a first embodiment.
Figure 2:
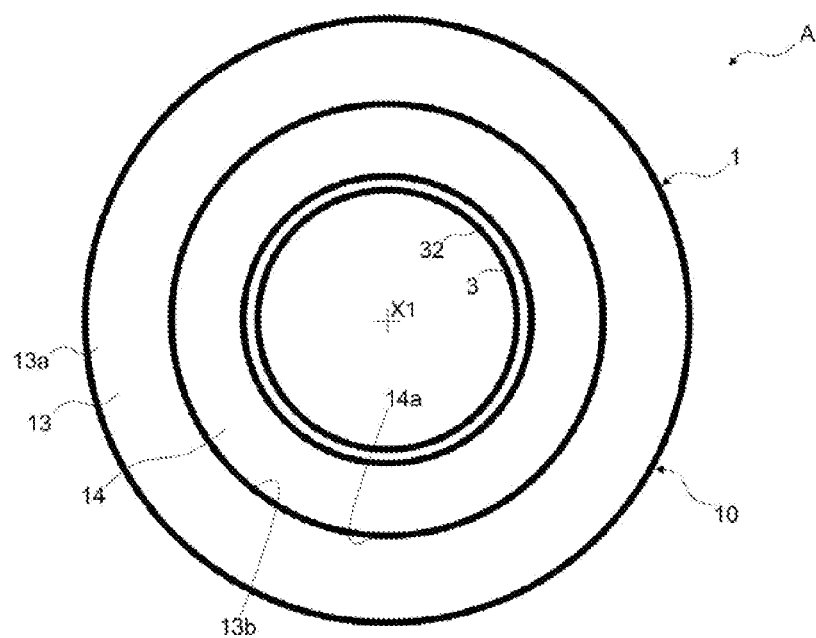
FIG. 2 is a front view of the bearing assembly according to the first embodiment.
Figure 3:
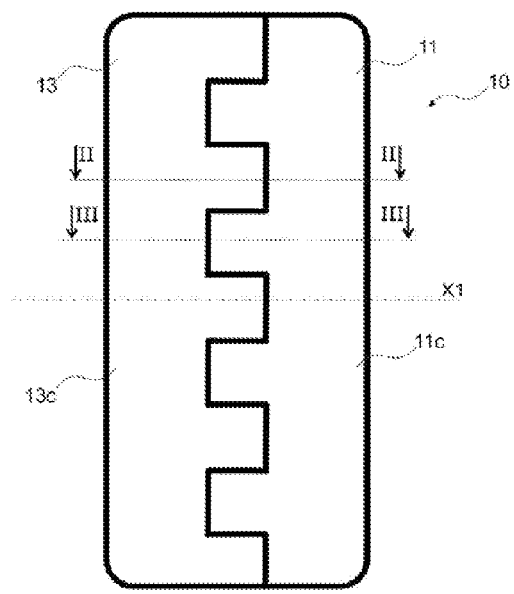
FIG. 3 is a side view of the bearing assembly according to the first embodiment.
Figure 4A:
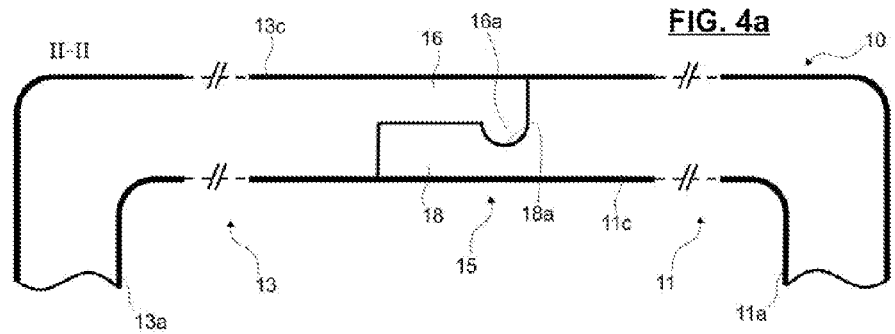
FIGS. 4a and 4b are the cross-sectional views II-II and III-III respectively of details of an envelope of a bearing assembly according to the first embodiment.
Figure 4B:
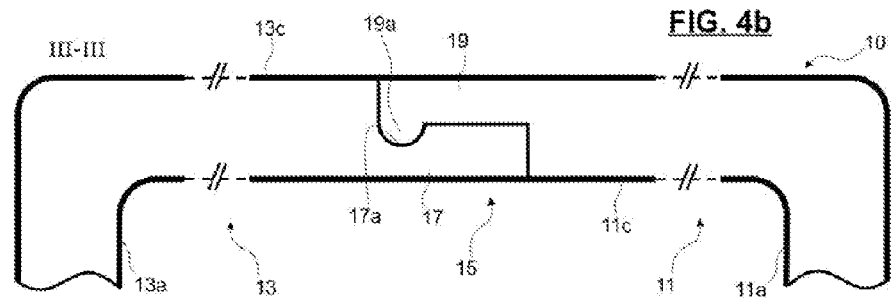

An assembly A includes a bearing 1 with a central axis of rotation X1 including an outer ring 2, an inner ring 3, a row of rolling elements 4, in this case balls, arranged in parallel planes and held respectively by a cage 5. Such an assembly is designed to be mounted in a housing provided in a mechanical system (not shown).

The rings 2, 3 are coaxial to the central axis X1 in normal operating mode.

The outer ring 2 has an outer cylindrical surface 21 and a hole 22 in which a race is formed for the rolling elements 4.

The inner ring 3 has an outer cylindrical surface 31 in which a race is formed for the rolling elements 4.

The inner ring 3 may be in relative rotation and the outer ring 2 non-in relative rotation or vice versa, or both rings may be in relative rotation in relation to the other about the central axis X1.

The outer ring 2 is delimited axially by two front radial edges 23 and 24 and the inner ring 3 is delimited axially by two front radial edges 33 and 34 such that the edges are respectively aligned axially to define an axial dimension of the bearing 1.

The inner ring 3 also has a cylindrical through-hole 32. For example, a shaft or supporting element may be inserted into the hole 32. The hole 32 in the inner ring 3 and the outer cylindrical surface 21 of the outer ring 2 define a radial dimension of the bearing.

The outer cylindrical surface 31 of the inner ring 3, the hole 22 of the inner ring 2 and the front radial edges 23, 33 and 24, 34 form a bearing chamber 8 within which the rolling elements 4 move between the rings 2, 3. The bearing chamber 8 may be filled with lubricant, for example grease or oil, to reduce friction between the contact surfaces of the moving elements, in this case the rolling elements 4, the race formed on the outer cylindrical surface 31 and the race formed in the hole 22 in the inner ring 2.

The rings 2, 3 and the rolling elements 4 determine a pitch diameter P1 of the bearing 1 that is an axis of rotation of the rolling elements, the rings being in relative rotation parallel to this axis located between the rings.

According to the embodiment shown in FIGS. 1 to 10, the pitch diameter P1 is parallel to the central axis of rotation X1. According to an alternative not shown, the pitch diameter P1 may be perpendicular to the central axis.

According to the invention, the assembly A also includes an envelope 10 mounted on the outer ring 2.

The envelope 10 includes a first envelope part 11 and a second envelope part 13 that are distinct, each having an annular flange 11a, 13a at least partially overlapping a front edge 23, 24 respectively of the outer ring 2.

The first and second envelope parts 11, 13 each have a cylindrical portion 11c, 13c respectively extending axially from the flange 11a, 11b towards the other envelope part.

The cylindrical portions 11c, 13c each overlap a portion of the outer cylindrical surface 21 of the outer ring 2.

The two parts 11, 13 of the envelope 10 are rigidly connected together using attachment means 15 provided on the cylindrical portions 11c, 13c.

The attachment means 15 provide a cavity 11e formed at one end portion of the cylindrical portion 11c of the first envelope part 11 and a relief 13e formed at one end portion of the cylindrical portion 13c of the second envelope part 13.

According to a first embodiment illustrated in FIGS. 1, 2, 3, 4a and 4b, the end portions of the first and second envelope parts 11, 13 provide pluralities of tabs 16, 17, 18, 19.

The end portion of the cylindrical portion 11c of the first envelope part 11 includes a plurality of tabs 18, each having a cavity 18a. Between two successive tabs 18, the end portion of the cylindrical portion 11c includes in each instance a tab 19 provided with a relief 19a. The tabs 18 and 19 are thus adjacent and alternate with a relief 19a or a cavity 18a.

Furthermore, the thickness of the tabs 18 and 19 is less than the thickness of the rest of the cylindrical portion 11c.

The tabs 18 extend the outer cylindrical surface of the cylindrical portion 11c and are located towards the outside of the envelope part 11. The tabs 19 extend the inner cylindrical surface of the cylindrical portion 11c and are located towards the inside of the envelope part 11.

The end portion of the cylindrical portion 13c of the second envelope part 13 includes a plurality of tabs 16, each having a relief 16a. Between two successive tabs 16, the end portion of the cylindrical portion 13c includes in each instance a tab 17 provided with a cavity 17a. The tabs 16 and 17 are thus adjacent and alternate with a relief 16a or a cavity 17a.

Furthermore, the thickness of the tabs 16 and 17 is less than the thickness of the rest of the cylindrical portion 13c.

The tabs 16 extend the outer cylindrical surface of the cylindrical portion 13c and are located towards the outside of the envelope part 13. The tabs 17 extend the inner cylindrical surface of the cylindrical portion 13c and are located towards the inside of the envelope part 13.

The tabs 16 of the second envelope part 13 radially overlap the tabs 18 of the first envelope part 11, the reliefs 16a being housed in the cavities 18a. Similarly, the tabs 19 of the first envelope part 11 radially overlap the tabs 17 of the second envelope part 13, the reliefs 19a being housed in the cavities 17a. According to an alternative not shown, the tabs provided with reliefs may be radially overlapped by tabs provided with cavities.

The shapes of the reliefs 16a, 19a and of the related cavities 18a, 17a match one another.

Each relief 16a, 19a is an annular bead that is rounded to facilitate the axial sliding of the relief 16a, 19a along the end portion of the other envelope during assembly of the two envelope parts 11, 13. According to a variant not shown, the reliefs may have a beveled face designed to facilitate insertion.

The engagement of each relief 16a, 19a on the end portion of the other envelope is enabled by deformation of the tab 16, 19 bearing the relief 16a, 19a.

The sum of the thicknesses of the related tabs 16, 18 and 17, 19 is equal to the thickness of the rest of the cylindrical portions 11c, 13c, thereby forming a substantially cylindrical outer surface of the envelope 10, enabling the assembly to be housed in a standard seat.

The reliefs 16a, 19a housed in the cavities 18a, 17a respectively enable the rigid axial attachment of the parts 13, 11 of the envelope 10.

Furthermore, once the envelope 10 has been assembled, the tabs 16, 19 and 17, 18 are circumferentially adjacent to one another. Since the attachment means belong alternately to the two distinct parts 11, 13, the attachment means 15 formed by the tabs 16, 17, 18, 19 prevent the relative rotation between the parts 11, 13 of the envelope 10.

The parts 11, 13 of the envelope 10 may be made of a plastic or synthetic material. The parts include at least one layer of material made of a vibration-damping material. The parts may also include at least one layer of electrically insulating material to prevent electrical currents from passing through the bearing.

The difference between the axial dimensions between the bearing 1 and the housing in which the assembly A is designed to be mounted is compensated by the envelope 10.

According to the embodiment, the assembly A also includes two annular flanges 12, 14 mounted on the radial edges 33, 34 respectively of the inner ring 3.

The flanges 12, 14 are rigidly connected to the inner ring 3 using attachment means (not shown), for example by welding, gluing, molding, cooperation of mechanical means such as parts of the flange and of the ring cooperating by shape, or any other appropriate means.

The free ends 11b, 13b of the flanges 11a, 13a of the envelope 10 mounted on the outer ring 2 are in sliding contact with the free ends 12a, 14a of the flanges 12, 14 of the inner ring 3. Contact is made at the pitch diameter P1 of the bearing 1. The bearing chamber 8 is sealed by the envelope 10 and the annular flanges 12, 14.

A second embodiment illustrated in FIGS. 5, 6, 7, 8a, 8b and 8c, in which identical elements are indicated using the same reference signs, differs from the first embodiment in that the tabs 25, 26 extend from the cylindrical portions 11c, 13c towards the other envelope part 13, 11 respectively.

The end portion of the cylindrical portion 11c of the first envelope part 11 includes a plurality of tabs 25, each having a relief 25a. The reliefs 25a are shown transparently in FIGS. 5 to 7 using broken lines in order to facilitate understanding of the embodiment of the invention.

The tabs 25 each extend axially from the cylindrical portion 11c towards the other envelope part 13 via a tab end 25b. The tab ends 25b are thinner than the rest of the cylindrical portion 11c. The tab ends 25b are provided with reliefs 25a. The tabs 25 are regularly spaced out about the circumference.

The tabs 25 extend the outer cylindrical surface of the cylindrical portion 11c and are located towards the outside of the envelope part 11.

A recess 27 is formed between two successive tabs 25. The tab ends 25b extend axially beyond the edges of the recesses 27.

The recesses 27 are thinner than the rest of the cylindrical portion 11c, extend the inner cylindrical surface of the cylindrical portion 11c and are located towards the inside of the envelope part 11.

Each recess 27 has a cavity 27a adjacent to a first tab 25 and a spacing zone 27b circumferentially adjacent to the cavity 27a on one side and to a second tab 25 on the other side.

Similarly to the first envelope part 11, the cylindrical portion 13c of the second envelope part 13 includes a plurality of tabs 26 provided with reliefs 26a at the ends of the tabs 26b.

Between two successive tabs 26, the cylindrical portion 13c includes a recess 28 provided with a cavity 28a and a spacing zone 28b.

In the assembled position of the parts 11, 13 of the envelope 10, the tab ends 25b of the first envelope part 11 radially overlap the recesses 28 of the second envelope part 13 causing the reliefs 25a carried on the tab ends 25b to be housed in the cavities 28a of the recesses 28. Similarly, the tab ends 26b of the second envelope part 13 radially overlap the recesses 27 of the first envelope part 13 causing the reliefs 26a carried on the tab ends 26b to be housed in the cavities 27a of the recesses 27.

The sum of the thicknesses of the tab ends 25b, 26b related to the recesses 28, 27 respectively is equal to the thickness of the rest of the cylindrical portions 11c, 13c, thereby forming a substantially cylindrical outer surface of the envelope 10, enabling the assembly to be housed in a standard seat.

Figure 6:
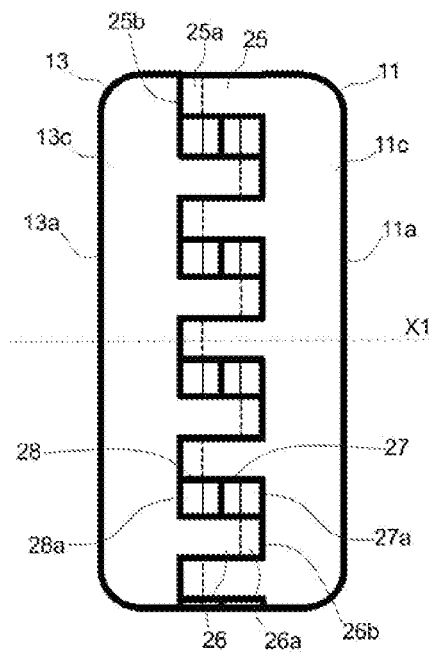
FIG. 6 is a side view of a second bearing assembly position according to the second embodiment.
Figure 7:
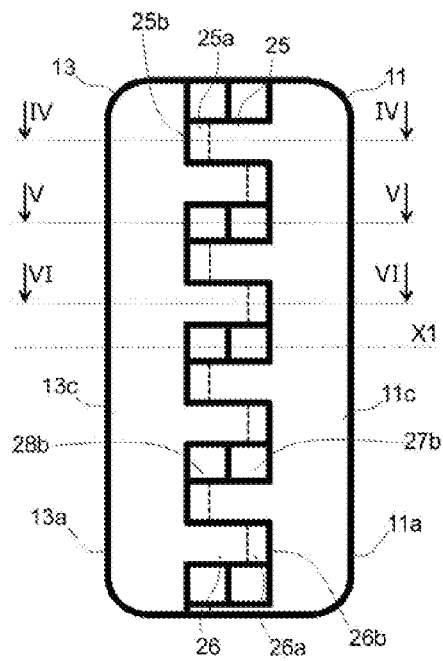
FIG. 7 is a side view of a third bearing assembly position according to the second embodiment.

The assembly method of an assembly A fitted with an envelope 10 having two parts 11, 13 according to the second embodiment of the invention includes the following successive steps, as illustrated in FIGS. 5 to 7.

A bearing 1 is assembled in advance.

Two envelope parts 11, 13 are positioned coaxially about the central axis X1 on either side of the outer ring 2 of the bearing 1.

The tab ends 25b of the first envelope part 11 slide axially onto the spacing zones 28b such that the tab ends 25b radially overlap the spacing zone 28b until stopped by the back edge of the recess 28. Similarly, the tab ends 26b of the second envelope part 13 slide axially onto the spacing zones 27b until stopped by the back edge of the recess 27.

A relative rotation about the central axis X1 is applied to the first and second envelope parts 11, 13 such as to cause the tab ends 25b bearing the reliefs 25a to slide in rotation towards the cavities 28a of the recesses 28, and the tab ends 26b bearing the reliefs 26a to slide in rotation towards the cavities 27a of the recesses 27.

The relative rotation is performed until the reliefs 25a, 26a are completely housed in the cavities 27a, 28a respectively.

In the assembled position, the spacing zones 27b and 28b, which are used for the initial insertion of the tabs 25, 26 before the final positioning of same, are arranged in axially adjacent pairs, forming recess portions.

The assembly method described above may be adapted without limitation for other embodiments of the invention. For example, a similar method may be implemented for an assembly A according to the first embodiment with a plurality of regularly spaced reliefs 13e and cavities 11e.

A third embodiment, illustrated in FIG. 9, in which identical elements are indicated using the same reference signs, differs from the second embodiment in that the cavities 27a, 28a each have a flared edge 27c, 28c to facilitate insertion of the reliefs 26a, 25a respectively during the relative rotation of the envelope parts 11, 13.

The cavities 27a, 28a are provided with flared edges 27c, 28c in the direction of insertion of the respective reliefs 26a, 25a.

A fourth embodiment, illustrated in FIG. 10, in which identical elements are indicated using the same reference signs, differs from the first embodiment in that the assembly A is provided with an outer envelope 10 mounted on the outer ring 2 of the bearing 1 and an inner envelope 40 mounted on the inner ring 3 of the bearing 1.

The outer envelope 10 is as disclosed in any one of the embodiments or alternatives described above.

The inner envelope 40 includes a first envelope part 42 and a second envelope part 44 that are distinct, each having an annular flange 42a, 44a at least partially overlapping a front edge 33, 34 respectively of the inner ring 3.

The first and second envelope parts 42, 44 each have a cylindrical portion 42c, 44c respectively extending axially from the flange 42a, 44a towards the other envelope part.

The cylindrical portions 42c, 44c each overlap a portion of the hole 32 in the inner ring 3.

The two parts 42, 44 of the inner envelope 40 are rigidly connected together using attachment means 45 provided on the cylindrical portions 42c, 44c.

The attachment means 45 are as disclosed in any one of the embodiments or alternatives described above.

The outer circumferential edges 42b, 44b of the flanges 42, 44 respectively of the inner envelope 40 mounted on the inner ring 3 of the bearing 1 come into sliding contact with the inner circumferential edges 11b, 13b of the flanges 11, 13 respectively of the outer envelope 10 mounted on the outer ring 2 of the bearing 1.

During relative rotation of the inner and outer rings 3, 2 of the bearing 1, the edges 42a and 11b, 44a and 13b remain in contact and slide on one another.

According to embodiments not shown, the bearing may have one or more rows of rolling elements. The rolling elements may be balls, rollers, needles or any other type of rolling element.

The technical features of the embodiments and variants provided for above may be combined.

The invention claimed is:

1. A bearing assembly configured to be mounted in a housing, comprising:
    a bearing provided with:
        a first ring having a hole, two front edges and an outer cylindrical surface,
        a second ring having a hole, two front edges and an outer cylindrical surface, the first and second rings being in relative rotation about a central axis (X1), and
        at least one row of rolling elements housed in a bearing chamber formed between an outer cylindrical surface and a hole of the rings,
    at least one envelope mounted on one of the rings of the bearing, such that:
        a dimensional difference between the housing and the bearing is compensated by the envelope,
        the envelope includes a first envelope part and a second envelope part that are distinct, each having an annular flange at least partially overlapping a front edge of the ring and a cylindrical portion extending from the flange and at least partially overlapping the cylindrical surface or hole of the ring outside the bearing chamber,
        the two envelope parts are rigidly connected together using attachment means provided on the cylindrical portions, and
        the attachment means provide at least one cavity formed at one end portion of the cylindrical portion of the first envelope part and at least one relief formed at one end portion of the cylindrical portion of the second envelope part, the at least one relief being housed in the related cavity to attach the first and second envelope parts the assembly (A), wherein
    the annular end portion of the cylindrical portion of the first envelope part includes a plurality of reliefs and cavities spaced out regularly, successively and alternately about the circumference, and wherein
    the annular end portion of the cylindrical portion of the second envelope part includes a plurality of reliefs and cavities spaced out regularly, successively and alternately about the circumference,
    wherein at least one envelope part is provided with at least one spacing zone that is circumferentially adjacent to the end portion provided with the at least one cavity on one side and to the end portion provided with the at least one relief on the other side.

2. The bearing assembly according to claim 1, wherein at least one flange of the envelope mounted on the first ring is in sliding contact with the other ring, either directly against one of the surfaces of the second ring or indirectly against an element rigidly connected to the second ring.

3. The assembly according to claim 1, wherein the one end portion of the cylindrical portion of the first envelope part comprise a plurality of tabs toward the second envelope part, and
    wherein the at least one cavity formed at the one end portion of the cylindrical portion of the first envelope part resides between a pair of the plurality of tabs.

4. The bearing assembly according to claim 1, wherein the annular end portions provided with a plurality of reliefs and cavities successively and alternately of the cylindrical portions of the first and second envelope parts are circumferentially adjacent.

5. A method for assembling a bearing assembly (A) including at least one envelope part having at least one spacing zone that is circumferentially adjacent to an end portion provided with a cavity on one side and to an end portion provided with a relief on the other side, the method comprising:
    providing a pre-assembled bearing including rings that rotate relative to a central axis (X1),
    positioning the at least one envelope part coaxially and on either side of one of the rings of the bearing, an end portion of a first envelope part of the at least one envelope part including at least one attachment means comprising the relief and an end portion of a second envelope part of the at least one envelope part including at least one attachment means comprising the cavity, at least one envelope part having at least one spacing zone that is circumferentially adjacent to the end portion provided with the cavity on one side and to the end portion provided with the relief on the other side,
    sliding axially onto at least one spacing zone of the other envelope part the end portion of one of the envelope parts such that the end portion overlaps the spacing zone radially,
    sliding the end portion including at least one attachment means of one of the envelope parts in rotation from the spacing zone towards the end portion including at least one attachment means of the other envelope part by applying a relative rotation about the axis (X1) to the envelope parts, and
    wherein the attachment means of the envelope parts cooperating with one another.

* * * * *